United States Patent [19]

Bendure et al.

[11] 4,122,731

[45] Oct. 31, 1978

[54] MULTISPEED GEAR TRANSMISSION WITH PLURAL INPUTS TO INTERNAL GEAR

[75] Inventors: Harry Bendure, Coffeyville; Larry L. Traxson, Cherryvale, both of Kans.

[73] Assignee: Gardner-Denver Company, Dallas, Tex.

[21] Appl. No.: 779,210

[22] Filed: Mar. 18, 1977

[51] Int. Cl.² .................................................. F16H 37/06
[52] U.S. Cl. ............................................. 74/674; 74/664
[58] Field of Search ................... 74/674, 675, 661, 664

[56] References Cited

U.S. PATENT DOCUMENTS

| | | | |
|---|---|---|---|
| 1,395,735 | 11/1921 | Sawyer | 74/675X |
| 2,241,764 | 5/1941 | Bollinger et al. | 74/661 X |
| 2,417,198 | 3/1947 | Hindmarch | 74/675 |
| 2,781,674 | 2/1957 | Kaerger | 74/661 |
| 3,748,927 | 7/1973 | Hertzog et al. | 74/675 |
| 3,798,999 | 3/1974 | Fritsch | 74/674 |

*Primary Examiner*—Samuel Scott
*Assistant Examiner*—Lance W. Chandler
*Attorney, Agent, or Firm*—Michael E. Martin

[57] ABSTRACT

A multispeed gear transmission having an internal gear driving an output shaft. The internal gear is in constant mesh with a plurality of drive pinions. Each drive pinion is connected to a fluid actuated clutch. The driving members of the clutches are driven by respective gears in constant mesh with each other or with a common input gear. Auxiliary output shafts may be driven by a gear meshed with the internal gear or by one of the drive pinions.

9 Claims, 5 Drawing Figures

MULTISPEED GEAR TRANSMISSION WITH PLURAL INPUTS TO INTERNAL GEAR

BACKGROUND OF THE INVENTION

Various types of gear transmissions are known which are characterized by arrangements of plural fluid actuated clutches for drivingly connecting an input shaft to an output shaft through external gear meshes whereby the speed and direction of rotation of the output shaft may be selectively varied. U.S. Pat. No. 3,913,411 assigned to the assignee of the present invention pertains to improvements in the abovenoted general type of gear transmission.

In the art of gear transmissions for winch drives, wheel drives and similar applications it is desirable to make the transmission as compact as possible without sacrificing multi-speed capability. Moreover, it is also desirable with such types of applications for gear transmissions to provide the power shifting capability which may be obtained with fluid actuated multiple disk clutches or equivalent devices.

SUMMARY OF THE INVENTION

The present invention provides for a multispeed constant mesh gear transmission of a compact and rugged design wherein a plurality of drive pinions are in constant mesh with an internal gear which is connected to an output shaft of the transmission. The drive pinions are drivenly connected to selectively actuated clutches whereby the output speed or direction of rotation of the output shaft may be controlled at will.

The present invention also provides for a constant mesh gear transmission wherein plural pinions are engaged with an internal ring gear whereby large speed reduction ratios may be achieved in a compact unit. The arrangement of plural pinions spaced apart around an internal ring gear provides for spacing the pinion shafts closer together than with an all external gear arrangement. Moreover, ancillary takeoff shafts for power and braking may be connected directly to the output side of the transmission drive path without enlarging the space occupied by the transmission.

The present invention further comprises a constant mesh gear type transmission of compact design wherein for a given input speed two different output speeds may be obtained in the same output direction of rotation or opposite output rotation direction at respectively different output speeds may be obtained depending on the input shaft arrangement.

Other advantages and superior features of the present invention will be recognized by those of ordinary skill in the art upon reading the detailed description herein.

DESCRIPTION OF THE PREFERRED EMBODIMENTS

Figure 1:
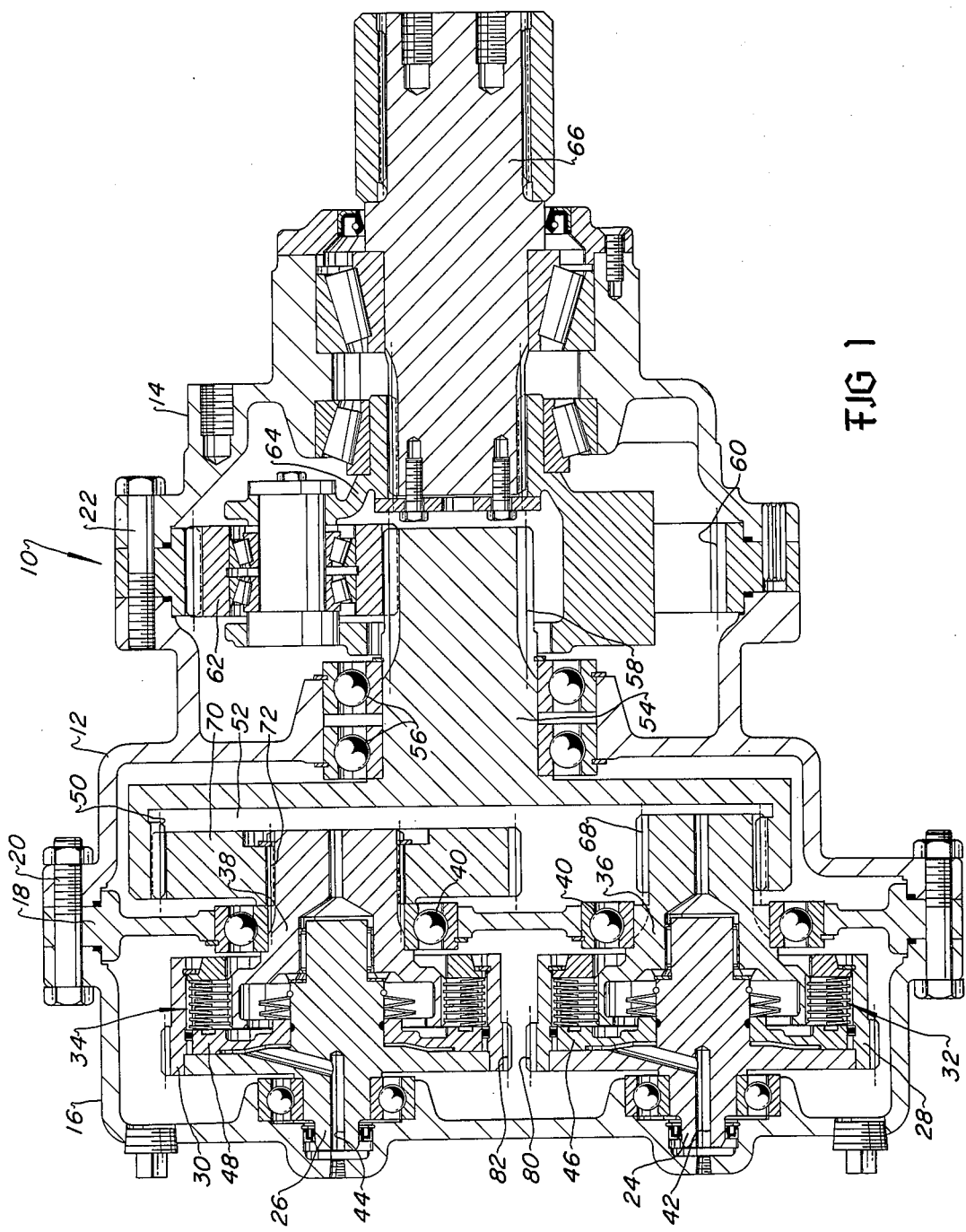
FIG. 1 is a longitudinal section view of a gear transmission in accordance with the present invention taken along the line 1—1 of FIG. 3.
Figure 2:
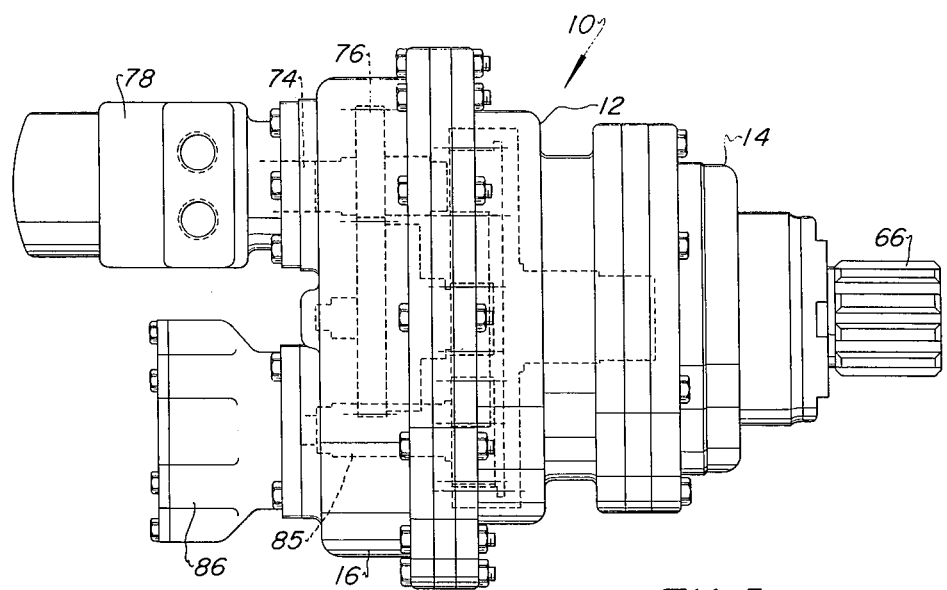
FIG. 2 is a side elevation of the transmission shown in FIG. 1.

Referring to FIGS. 1 and 2 an embodiment of the present invention comprising a multispeed gear transmission is generally designated by the numeral 10. The transmission 10 includes a multipart housing including a center part 12, an output end cover 14, and an input end cover 16. A bearing support 18 is interposed between the center part 12 and the input end cover 16. The housing parts above described are suitably secured in assembled relationship in a conventional manner by fasteners 20 and 22.

The transmission 10 is also characterized by a pair of spaced apart and parallel shafts 24 and 26 which are respectively fixed to cylindrical members 28 and 30 comprising one side of respective fluid actuated clutches generally designated by the numerals 32 and 34. The clutches 32 and 34, respectively, include output shafts 36 and 38 which are mounted for rotation in suitable bearings 40 disposed on the support 18. The clutches 32 and 34 are of the fluid actuated multiple disk type wherein by introducing pressure fluid into passages 42 and 44 respective pistons 46 and 48 are actuated to engage the clutches. In the engaged condition the members 28 and 30 are respectively drivingly connected to the shafts 36 and 38. The clutches 32 and 34 are basically of a well known type and are described in further detail in U.S. Pat. No. 3,913,411. When the clutches 32 and 34 are disengaged the shafts 24 and 26 may rotate with respect to their respective coaxial shafts 36 and 38.

The transmission 10 is further characterized by a relatively large diameter internal gear 50 which includes a disk-shaped web 52 which is fixed to a hub portion 54 rotatably mounted in bearings 56. The hub portion 54 comprises an output shaft portion of the internal gear 50. In the transmission 10 shown the hub portion 54 also comprises a sun gear 58 for a planetary gear stage. The planetary gear stage also includes a stationary ring gear 60, planet gears 62, one shown, and planet gear carrier 64. The planet gear carrier 64 is connected to an output shaft 66. As may be appreciated by those skilled in the art, a transmission in accordance with the present invention may be provided wherein the shaft portion 54 is the final output shaft or as exemplified by the embodiment of FIG. 1 further gearing may be drivenly connected to the internal gear 50.

Figure 3:
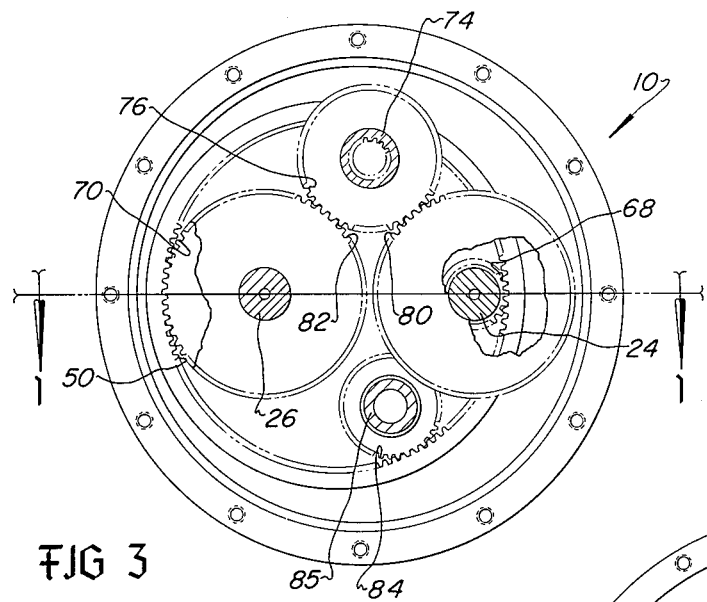
FIG. 3 is a transverse end view of the transmission shown in FIG. 2 with certain housing components removed to better illustrate the gearing arrangement.

The clutch output shaft 36 includes a pinion 68 formed thereon which is in constant mesh with the internal gear 50. The clutch output shaft 38 has a pinion 70 mounted thereon by suitable interfitting splines 72. The pinion 70 is also in constant mesh with the internal gear 50. With reference also to FIG. 3, wherein the end cover 16 and bearing support 18 are removed to illustrate the gearing arrangement, the transmission 10 further includes an input shaft 74 having an input gear 76 fixed thereon for rotation with the input shaft. The input shaft 74 is suitably connected to a hydraulic motor 78 or the like and may, of course, be adapted to be driven by other means. The input gear 76 is in constant driving mesh with gears 80 and 82 formed on the respective cylindrical clutch members 28 and 30. Accordingly the clutches 32 and 34 may be selectively engaged, one or the other, to provide for driving the internal gear 50 at a reduced speed relative to the input shaft 74. The speed ratio of the internal gear 50 with respect to the input shaft is, of course, dependent on whichever pinion 68 or 70 is in driving engagement with the internal gear.

The arrangement of the transmission 10 advantageously provides for further gear means to be engaged with the internal gear 50. As shown in FIGS. 2 and 3 an auxiliary gear 84 is in constant mesh with the internal gear 50. The gear 84 is fixed to a shaft 85 which is drivingly connected to a fluid actuated multiple disk brake unit 86. The gear 84 may, however, be adapted to drive another output shaft providing an auxiliary power take-off for the transmission 10 or, conversely, an auxiliary power input to the internal gear 50.

Figure 4:
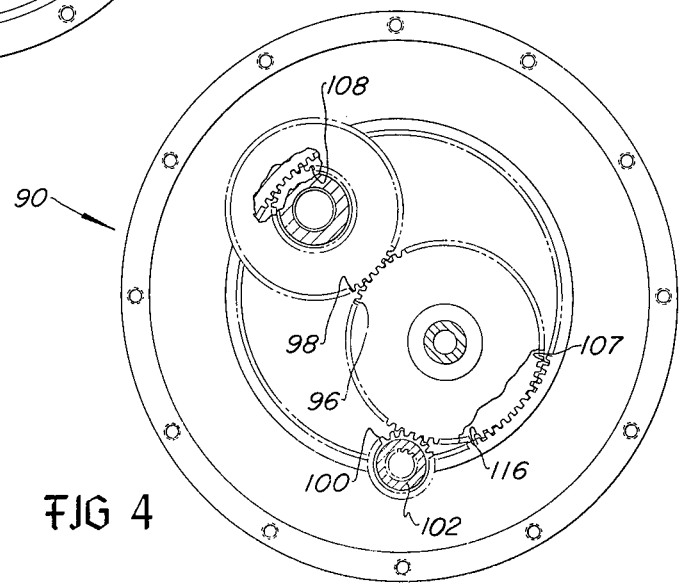
FIG. 4 is a transverse end view similar to FIG. 3 showing an alternate embodiment of the present invention.
Figure 5:
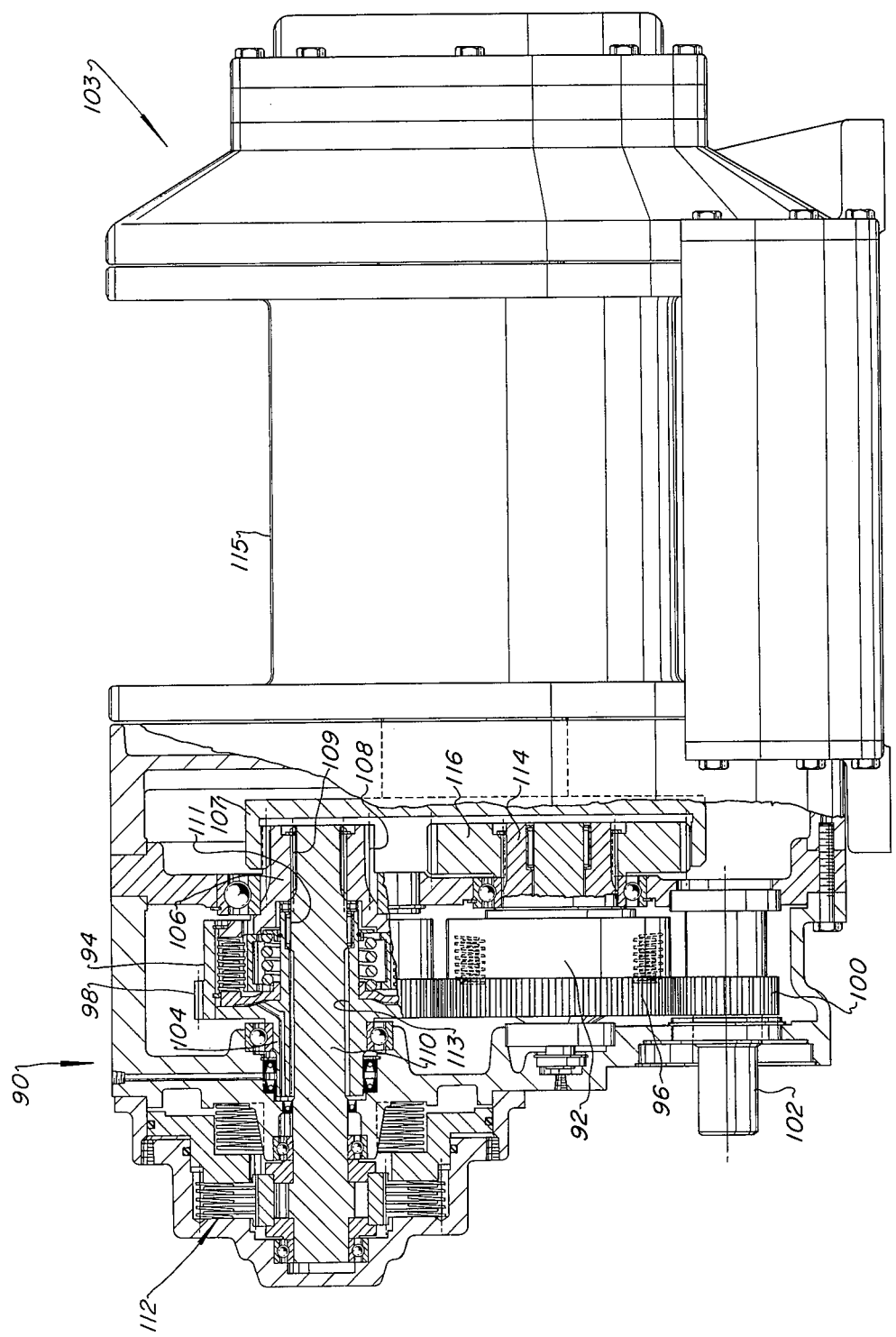
FIG. 5 is a partial longitudinal section view of the embodiment shown in FIG. 4.

Referring to FIGS. 4 and 5 an alternate embodiment of the present invention is shown comprising a gear transmission 90 similar to the transmission 10 except as described herein. The transmission 90 includes cylindrical clutch members 92 and 94, similar to the clutch members 28 and 30 of FIG. 1, and which are associated with fluid actuated clutches similar to the clutches 32 and 34. The members 92 and 94 are provided with gears 96 and 98 which constantly intermesh with each other. Furthermore, the transmission 90 is characterized by an input gear 100 which is in constant mesh with the gear 96 only. The input gear 100 is fixed on an input shaft 102, which may be connected to suitable driving means such as a hydraulic motor, not shown. In the transmission 90 the clutch members 92 and 94 are driven in opposite directions for a given direction of rotation of the input gear 100. Accordingly, the output shaft of the transmission 90 is driven in opposite directions of rotation at respectively different speed ratios depending on which clutch is engaged. The transmission 90 is particularly suitable for driving a winch 103 or the like wherein reeling in the winch cable or chain may require a relatively high speed ratio of the transmission input shaft with respect to the output shaft, and dereeling the cable may be accomplished at a suitably rapid rate, at a lower transmission speed ratio.

Referring to FIG. 5, the transmission 90 is further characterized by modified clutch input and output shafts 104 and 106. The shafts 104 and 106 are provided with suitable bores in which are coaxially disposed a shaft 110 which is connected to a hydraulic brake unit 112 similar to the brake unit 86. Suitable interfitting splines 109 are provided for drivingly interconnecting the shaft 110 with the clutch output shaft 106. The clutch output shaft 106 includes an integrally formed pinion 108 which is in constant mesh with an internal gear 107. The internal gear 107 is suitably drivingly connected to a rotary winch drum 115. The shaft 110 is rotatably supported in a bearing 111 disposed in the bore 113 of the clutch shaft 104. In the transmission 90 the clutch output shaft 114 is drivingly connected to a pinion 116 in constant mesh with the internal gear 107. The transmission 90 could also be modified such that the shaft 110 could be used as an auxiliary power takeoff or input shaft.

As may be appreciated from the foregoing description the arrangement comprising plural fluid actuated clutches having output pinions in constant mesh with an internal gear provides flexibility in designing for various specialized transmission applications. Transmission speed ratios may be varied by using clutch output pinions of different diameters and number of teeth, within limits. Moreover, the relatively large internal gear on the transmission output side permits close spacing of the transmission input shaft with other auxiliary power takeoff or input shafts to minimize the volume envelope of the transmission proper. Furthermore, the internal tooth mesh provided by the internal gears 50 and 107 on the transmission output side is inherently stronger than a comparable external gear arrangement and is located where the tooth loads are normally greater than elsewhere in the transmission.

It will be understood that the terms input and output are chosen in accordance with the power flow of a preferred embodiment of the invention. The internal gear shaft may be used as the input shaft for a speed increasing transmission.

What is claimed is:

1. A constant mesh gear transmission comprising:
   a housing;
   an input shaft having an input gear mounted thereon;
   a first clutch rotatably disposed in said housing including a first clutch gear and a first clutch output pinion;
   a second clutch rotatably disposed in said housing including a second clutch gear and a second clutch output pinion;
   said first and second clutches being operable to be selectively engaged and disengaged for driving their respective output pinions;
   an internal gear rotatably disposed in said housing and in constant mesh with said first and second clutch output pinions;
   said first and second clutch gears being arranged to be driven by said input gear in such a way that said internal gear may be rotatably driven by said first or second clutch output pinions when said first or second clutch is engaged, respectively.

2. The invention set forth in claim 1 wherein:
   said input gear is in constant mesh with said first clutch input gear and said second clutch input gear, respectively, whereby said internal gear is driven in the same direction of rotation when either of said clutches is engaged.

3. The invention set forth in claim 2 wherein:
   said first clutch output pinion has a greater number of teeth than said second clutch output pinion.

4. The invention set forth in claim 1 wherein:
   said first clutch gear is in constant mesh with said second clutch gear and said input gear is in constant mesh with only one of said clutch gears.

5. The invention set forth in claim 1 wherein:
   said transmission includes an auxiliary output pinion in constant mesh with said internal gear.

6. The invention set forth in claim 5 together with:
   brake means connected to said auxiliary output pinion.

7. The invention set forth in claim 1 wherein:
   said clutches respectively include rotatable clutch output shafts and said transmission includes an auxiliary output shaft drivenly connected to one of said clutch output shafts.

8. The invention set forth in claim 7 wherein:
   said auxiliary output shaft is disposed in coaxial alignment with said one clutch output shaft.

9. The invention set forth in claim 9 together with:
   brake means connected to said auxiliary output shaft.

* * * * *